US006964805B1

(12) United States Patent
Kuriyama et al.

(10) Patent No.: US 6,964,805 B1
(45) Date of Patent: Nov. 15, 2005

(54) TACK LABELS AND PLASTIC CONTAINERS WITH SUCH TACK LABELS

(75) Inventors: Tadashi Kuriyama, Matsudo (JP); Shuichi Koshio, Matsudo (JP); Takashi Miya, Matsudo (JP); Masashi Sasaki, Osaka (JP); Kiyokazu Ikai, Osaka (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 09/555,578

(22) PCT Filed: Oct. 5, 1999

(86) PCT No.: PCT/JP99/05491

§ 371 (c)(1), (2), (4) Date: Jul. 26, 2000

(87) PCT Pub. No.: WO00/21060

PCT Pub. Date: Apr. 13, 2000

(30) Foreign Application Priority Data

Oct. 5, 1998 (JP) ................................ 10-283061

(51) Int. Cl.[7] .......................... B32B 23/02; B32B 7/12; B32B 33/00; B32B 9/00

(52) U.S. Cl. ...................... 428/192; 428/194; 428/346; 428/350; 428/913; 428/40.1

(58) Field of Search .............................. 428/40.1, 41.5, 428/41.7–41.8, 42.2, 192, 194, 343, 346, 428/350, 354, 913

(56) References Cited

U.S. PATENT DOCUMENTS 4,032,679 A * 6/1977 Aoyagi ........................ 428/42
4,060,168 A * 11/1977 Romagnoli ................. 206/216
4,269,321 A * 5/1981 Ichinose et al. ............ 215/343
4,444,839 A * 4/1984 Dudzik et al. .............. 428/336
4,550,683 A * 11/1985 Jones ......................... 118/505
5,096,767 A * 3/1992 Harada et al. .............. 428/204
5,238,720 A * 8/1993 Volkman ................... 428/41.3
5,631,055 A * 5/1997 Vines et al. ............... 428/40.1

(Continued)

FOREIGN PATENT DOCUMENTS

EP 0 326 039 A1 * 2/1989

(Continued)

OTHER PUBLICATIONS

Kuraray Co. LTD, "Adhesive Compsn. for Labelling Recyclable Bottles etc.—Comprising Emulsion of EVA or Poly (meth)acrylate, and water-insol. cpd. that Swells or Dissolves in Alkali", Derwent Abstract, Acc. # 1993-317729 Week 199340, 1993.*

(Continued)

*Primary Examiner*—Harold Pyon
*Assistant Examiner*—Patricia L. Nordmeyer
(74) *Attorney, Agent, or Firm*—Oliff & Berridge, PLC

(57) ABSTRACT

A tack label difficult to peel from a container in a processing environment with normal temperature water and easy to peel from the container in a processing environment with hot water and a plastic container. The tack label according to this invention includes a label base material, a printing layer formed on one surface of this label base material, and an adhesive layer formed on the surface of the other of a label base material. The adhesive layer comprises an adhesive that is difficult to dissolve under an environment with normal temperature water and easy to dissolve under a processing environment with hot water. The result is a tack label that is difficult to peel from the container in a washing process, but easy to peel in a regenerating process.

6 Claims, 3 Drawing Sheets

U.S. PATENT DOCUMENTS

| | | | | | |
|---|---|---|---|---|---|
| 5,700,586 | A | * | 12/1997 | Laiho et al. | 428/507 |
| 6,023,865 | A | * | 2/2000 | Preuss | 40/310 |
| 6,165,576 | A | * | 12/2000 | Freedman et al. | 428/36.91 |

FOREIGN PATENT DOCUMENTS

| | | | | |
|---|---|---|---|---|
| EP | 0 326 039 | A1 | | 8/1989 |
| GB | 2 259 291 | | * | 3/1993 |
| GB | 2 259 291 | A | * | 3/1993 |
| GB | 2 259 291 | A | * | 10/1993 |
| JP | U-63-98573 | | | 6/1988 |
| JP | A 63-48707 | | | 9/1988 |
| JP | U-1-101270 | | | 7/1989 |
| JP | U-5-44509 | | | 6/1993 |
| JP | 05230427 | A | * | 9/1993 |
| JP | UM A 6-3423 | | | 1/1994 |
| JP | UM A 7-31261 | | | 6/1995 |
| JP | A 8-30201 | | | 2/1996 |
| JP | A-9-251273 | | | 9/1997 |
| JP | 410316819 | A | * | 12/1998 |

OTHER PUBLICATIONS

Specific Gravity of Major Polymers, reprinted Jul. 17, 2002 from http://www.plasticusa.com/specgrav.html.*

On the Distribution of Mass, Thickness, and Density in Paper, Dodson et al., Jun. 6, 2000.*

On the Distribution of Mass, Thickness, and Density in Paper, Dodson et al., Jun. 6, 2000.*

* cited by examiner

TACK LABELS AND PLASTIC CONTAINERS WITH SUCH TACK LABELS

TECHNICAL FIELD

This invention relates to a tack label stuck via an adhesive layer on the surface of a polyester bottle or the like, and a plastic container with such a tack label stuck thereto. More specifically, it is related to tack labels which may be peeled easily in the case of recycling plastic containers, and such plastic container with the tack label.

BACKGROUND ART

Polyester bottles (the so-called PET bottle etc.) are widely used as a container for drink water, soft drinks, juice, green tea, tea, sake, shochu, etc. In recent years, the request for recycling to the polyester bottles have been increasing remarkably from the viewpoint of environmental protection. Labels for displaying a brand name, contents, etc. are sometimes stuck. In recycling the polyester bottles, such labels needs to be peeled and removed in a regenerating process (hot water treatment or the like) of a regenerating plant. Moreover, in order to perform a regeneration efficiently, labels are desired to be peeled at each home from bottles before discarding them. For this reason, the labels are required to have excellent adhesivity and excellent adhering workability for the bottles as well as a contradictory characteristic that the labels can be peeled simply after the contents are consumed, while they are stuck with the sufficient adherence on the bottles and do not peel easily until the contents are consumed. In addition, when bottles are to be filled up with a materials following sticking of the label to empty bottles, the insides of the bottles are often washed with water, weakly alkaline wash liquid, or the like before the filling. In this washing process, it is required that the labels releasing stuck on the bottles, without being peeled.

An exampled Japanese utility model publication No. 6-3423 discloses a tack label in which an adhesive layer is provided in a back side of a label base material, as a container tack label which can simplify a work for peeling the label in recycling the container, wherein the adhesive layer is partially provided so that infiltration paths for a liquid to peel the label may be formed between the label base material and the container surface, when sticking the label base material to the container surface. Moreover, JP-A-8-30201 discloses, as a label for a container which can be easily peeled from the container even by showering at a low temperature in a short time, a label for a container in which an adhesion part comprising an adhesive layer is partially provided on a back surface of a label base material, and a plurality of infiltration paths for the liquid to peel are provides on the label base material to lead to said adhesion part. In addition, examined Japanese utility model publication No. 7-31261 discloses an adhesion label in which an adhesion layer formed on the whole back surface of a base material is masked with a non-adhesive masking agent in a network shape to expose the adhesive layer in the form of countless microscopic and uniform network-like dots and in which a part of the adhesion layer at one edge side of the label is completely covered with the masking agent.

However, when these labels are applied to polyester bottles and are subjected to the above-mentioned washing process before filling them up with a material, the adhesion power of the stuck label declines through the infiltrating of wash liquid into the infiltration paths and the network-like masked part for the label-peeling liquid, so that the label may be peeled. On the one hand, in distribution course, foreign substance, such as dust, are likely to enter into the infiltration paths or the network-like masked part for the label-peeling liquid.

DISCLOSURE OF THE INVENTION

The purpose of this invention is therefore to provide a tack label which has suitable adhesive property to a plastic container, and can be easily peeled from the container through treatment with hot water.

Another purpose of this invention is to provide a tack label which is difficult to peel from a container under a treating environment with water at normal temperature, and is easy to peel from the container under a treating environment with not water.

Moreover, a further purpose of this invention is to provide a plastic container with a tack label which is difficult to peel from a container body by washing under the normal temperature environment, and is easy to peel from the container body under the environment with hot water.

Another purposes of this invention are providing a plastic container with a tack label in which a tack label is peeled easily from a container body in the regeneration treating process in a regeneration treating plant.

Furthermore, a still further purpose of this invention is to provide a plastic container which allows a peeled tack label and a container body to be easily separated in a regeneration treating process.

In order to attain the above-mentioned purpose, the tack label according to this invention comprises a sheet-like label base material, a printing layer formed on a first surface of the label base material, and an adhesive layer formed on a second surface opposite to the first surface of the label base material, wherein said adhesive layer comprises a hot-water soluble adhesive which is difficult to dissolve in water at normal temperature, and is easy to dissolve in hot water.

Water at normal temperature of about 22° C. is used in a washing process performed before filling it up with a material into the plastic container having the tack label, whereas hot water at about 75° C. is used to peel the tack label from the container in a regenerating process. The tack label which is easy to peel from the container in the regenerating process, while not peeled from the container in the washing process can be obtained, by using the adhesive having a high peeling resistance (difficult to peel) under the hot water environment, and a low peeling resistance (easy to peel) under the normal-temperature environment in view of the difference in the treating temperature. Based on this recognition, the inventors performed experiments and analyses on the relationship among the solubility for water, the peeling performance and the temperature with respect to various adhesives. Consequently, it was found that the solubility to water and peeling resistance are related closely to one another, and the peeling resistance declines as the solubility to water becomes higher so that the label may be easily peeled. Further experiments revealed that the acrylic water-soluble adhesive has the property that the solubility to water is nonlinear to the temperature. That is, if such an adhesive having the nonlinear solubility characteristic to the temperature is used as an adhesive layer for the tack label, the tack label can be obtained, which may be peeled from a container in a short time under the treating environment using a hot water while being not peeled under the processing environment using normal temperature water. On the one land, since the solubility to water of the water-soluble adhesives usually used is relatively high and the solubility characteristic for the temperature is almost constant, the tack label is peeled from the container in a regenerating process in a short time, and the tack label is also easy to peel from the container under the treating environment using normal temperature water. Moreover, since the adhesion intensity for temperature of the synthetic resin adhesives usually used is constant under the treating environment with water, a desirable peeling property cannot be attained in the regenerating process, although peeling is good against the washing process.

A preferred embodiment of the tack label according to this invention comprising the adhesive layer made of the acrylic water-soluble adhesives. The acrylic water-soluble adhesive containing a nonionic surfactant has a conspicuous nonlinear characteristic in the solubility i.e., peeling resistance, to the temperature of water used. Moreover, it hardly dissolves in water at the normal temperature, but has a very high solubility to hot water at about 75° C. For this reason, the desirable tack label which is difficult to peel from the container in the treating environment with normal temperature water, and is ease to peel under the treating environment with hot water can be obtained.

Another preferred embodiment of the tack label according to this invention is characterized in that a non-adhesive masking layer is formed in a part of the adhesive layer, and only this part of said adhesives layer has adhesiveness. Sufficient adhesion strength can be obtained between the tack label and the plastic container. On the one hand, when the non-adhesive masking layer is formed in a part of the adhesive layer, the peeling property can be increased, in the recycling process, while maintaining sufficient adhesion strength between the plastic container.

A further preferred embodiment of the tack label according to this invention is characterized by forming the masking layer in a nearly central part of the adhesive layer, and said adhesive layer having a ring-shaped adhesive area. When the ring-shaped adhesion area is formed along with the edge of the tack label between the tack label and the container, only the edge of the tack label contacts wash water in the washing process. Consequently, the advantage that the label can be prevented from peeling in the washing process, while maintaining the excellent adhesiveness between the container, since the contact area with water decreases.

A further preferred embodiment of the tack label according to this invention is characterized in that the non-adhesive masking layer is formed in the central part and a part of the edge of said adhesive layer. Since this edge portion is not adhered to the container when the masking layer is formed in a part of the edge of the tack label, a consumer can peel the tack label easily from the container by peeling this edge portion with hand, after using up the material contained.

A preferred embodiment of the tack label according to this invention is characterized in that the surface area of the masking layer is 5–90% of that of said adhesive layer.

A preferred embodiment of the tack label according to this invention is characterized by the label base material comprising the material with a specific gravity being less than 1. Since the specific gravity of the material of the plastic container to which the tack label is stuck is about 1.3, the tack label and the container may be easily separated by using the material with the specific gravity of less than 1 as the base material of the tack label in the regeneration treating process under hot water environment.

The plastic container with the tack label according to this invention is a plastic container to which the tack label is stuck, and is characterized in that said tack label comprises a sheet-like label base material, a printing layer formed on a first surface of the label base material, and an adhesive layer formed on a second surface which opposes to the first surface of the label base material for adhering the tack label on the surface of a container body, said adhesive layer comprises a hot water-soluble adhesive which is ease to peel from the container body under a treating environment with hot water, while said tack label is not peeled from a container body under a treating environment with water at a normal temperature A preferred embodiment of the plastic container with the tack label according to this invention is characterized by the tack label peeling from the container body within 30 minutes when immersed in hot water at 75° C. while the tack label not peeling from the container body 1 hour or more after being immersed in 40° C. water. Thus, by using the tack label having a nonlinear peeling resistance to the temperature of water at the time of treating the container with the tack label, excellent adhesion strength can be maintained between the container and the tack label in the washing process, and the tack label can be peeled from the plastic container, without performing special work or special treatment, in the reproduction process using hot water.

The plastic container with the tack label according to this invention is characterized by forming a non-adhesive masking layer in a part of adhesive layer, said part of the tack label having adhered to the surface of the container body. Moreover, this example is characterized by forming a ring-shaped adhesion area between the tack label and the container body. When the ring-shaped adhesion area is formed between the container and the tack label, the peeling property in the regeneration process can be improved, while maintaining excellent adhesiveness between the container and the tack label.

A preferred embodiment of the plastic container with the tack label according to this invention is characterized by the label base material of the tack label comprising of the material with a specific gravity of less than 1. Since the tack label peeled from the container floats in hot wart and the plastic container sinks in water when the specific gravity of the label base material is less than 1, the container and the tack label can be separated, without performing a special work.

BRIEF DESCRIPTION OF DRAWINGS

Based on the preferred embodiments shown in the attached drawings, tack labels and plastic containers with such tack labels according to this invention are explained in detail.

BEST MODE FOR CARRYING OUT THE INVENTION

Figure 1:
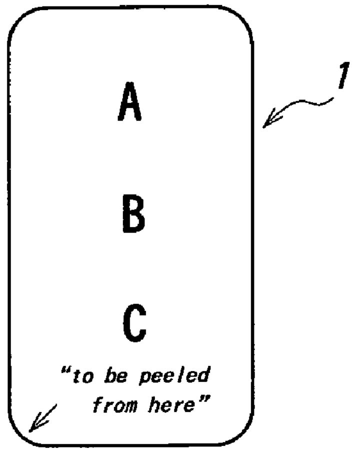
FIG. 1 is an elevational view showing an embodiment of the tack label of this invention.
Figure 2:
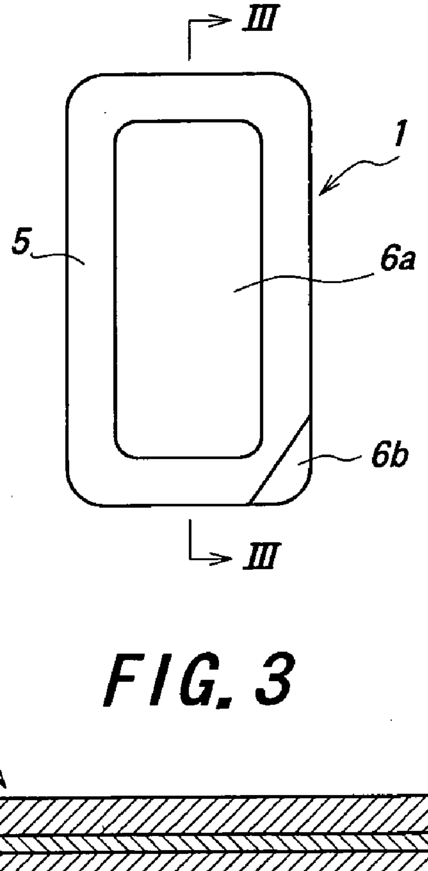
FIG. 2 is a back side view of the tack label shown in FIG. 1.
Figure 3:
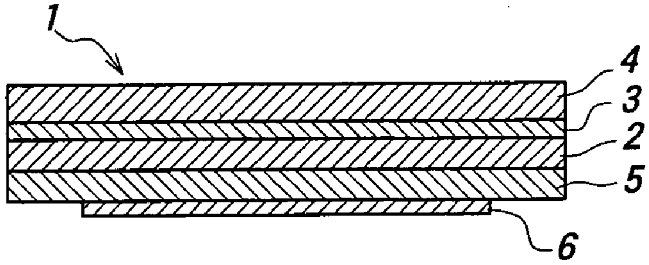
FIG. 3 is an m-m line sectional view of the tack label shown in FIG. 1.

A tack label 1 shown in FIG. 1 has a label base material 2 which is nearly rectangle-shaped, and a printed layer 3 for displaying brand name, contents, etc. are formed on a surface side and a covering layer 4 for covering said printing layer 3 in this order as shown in FIG. 3. An adhesive layer 5 for adhering onto a surface of a plastic container and a non-adhesive masking layer 6 for covering said adhesive layer 5 partially are formed on the back side of the label base material 2 in this order, for example. The label base material 2 is formed with the material whose specific gravity is less than 1. Moreover, the adhesive layer 5 comprises a hot water-soluble adhesive which hardly dissolves in water at normal temperature, but has a high solubility to hot water, and the layer 5 is formed all over the back side of the label base material 2. The non-adhesive masking layer 6 is formed on a central part 6*a* except a peripheral edge portion and one end marginal part 6*b* separated from said central part 6*a* (for example, a corner portion) within the surface of the adhesive layer 5. The adhesive layer 5 forms an adhesion area exposed in a shape of a ring (in a frame-like shape) along the entire circumference of the tack label 1.

Figure 4:
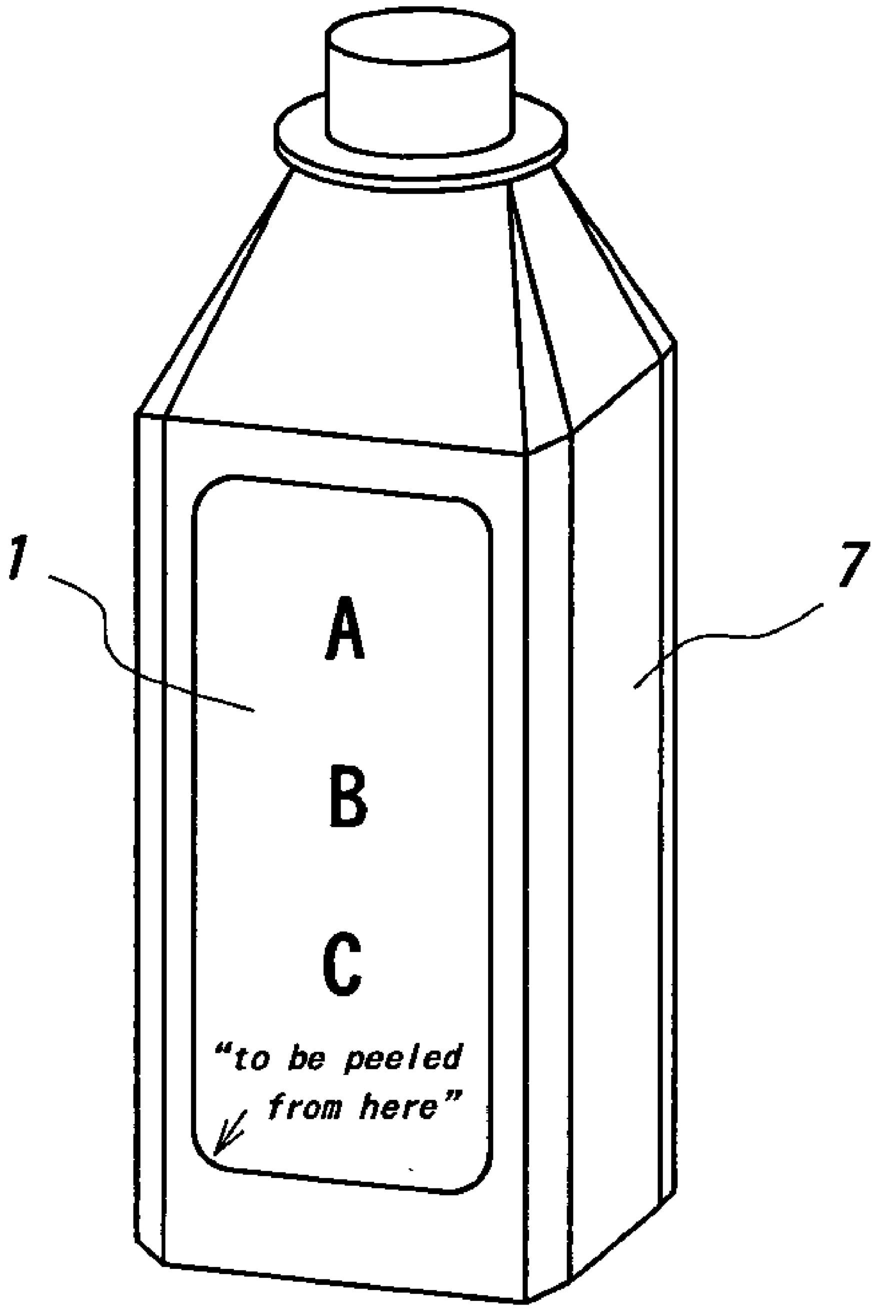
FIG. 4 is a perspective view showing an embodiment of the polyester bottle with the tack label according to this invention.

As shown in FIG. 4, when this tack label 1 is stuck onto the surface of a polyester blow (molded) bottle 7, the adhesive layer 5 is exposed in the shape of ring along the entire circumference of the label. Therefore, the label can be stuck smoothly and easily with an automatic label sticking apparatus, and can stick beautifully and certainly, without producing accidental peeling. Moreover, even if water of normal temperature (for example, 15° C.), alkalescent washing liquid or the like, washes the inside of the bottle 7 after sticking the tack label 1 on the bottle 7 but before filling it up with contents, washing liquid such as water does not infiltrate into the whole label easily like the conventional label with which the infiltration paths, the work-like masking part or the like for the label peeling liquid were formed. Consequently, the reduction of the adhesion power of the label by action of water used in the washing process can be prevented. Moreover, in distributing course after sticking the label, it can also be prevented that foreign substances, such as dust, enter between the bottle 7 and the tack label 1.

On the one hand, in the above-mentioned tack label 1, since one end marginal part 6*b* (that is, an edge part of the tack label 1) of the surface of the adhesive layer 5 is covered with the non-adhesive masking layer 6, the non-adhering part (grip part) for peeling is ensured between the tack label 1 and the surface of bottle 7 when the tack label 1 is stuck onto the bottle 7. Since the central part 6*a* on the surface of the adhesive layer 5 is also covered with the non-adhesive masking layer, the adhesion area with the bottle 7 is very small. For example, the exposed area of the adhesive layer 5 can be reduced to 10–95% (preferably 15–40%) of all the surface area of the adhesive layer 5 in a case where no masking layer is provided. Therefore, when the tack label 1 is to be peeled after consuming the contents of the bottle 7, the edge part of the tack label 1 can be pinched and raised by putting a nail etc. into said non-adhering part, so that the label can be removed easily. For example, it may be peeled with about one fifth of power required for the tack label in which the whole surface of the adhesive layer is exposed. In addition, as mentioned above, the adhesive layer 5 is exposed having no break in the shape of ring along the entire circumference of the label, although if the exposure area of the adhesive layer 5 is small. Thus, the risk of accidental peeling is avoided.

Figure 5A:
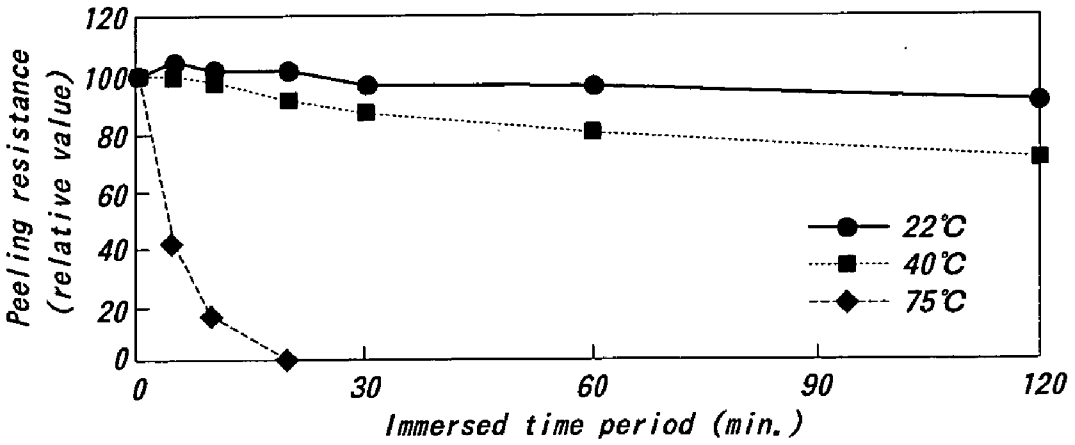
FIG. 5 is a graph which shows the peeling resistance to water at various temperatures of the plastic container with the tack label according to this invention, FIG. 5A showing the characteristic of the plastic container with the tack label of this invention, FIG. 5B showing the characteristic of a container with a tack label using a conventional synthetic resin as adhesives, and FIG. 5C showing the characteristic of a container with a tack label using a conventional water-soluble adhesives.
Figure 5B:
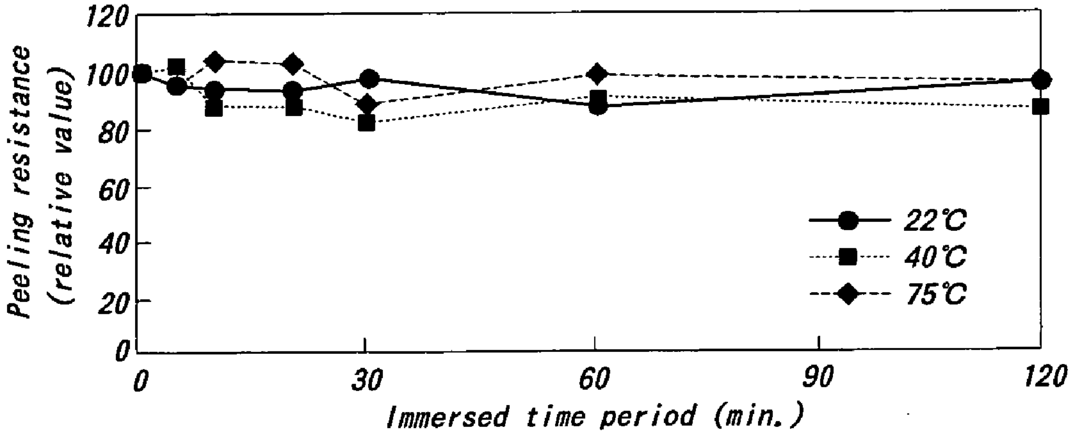
Figure 5C:
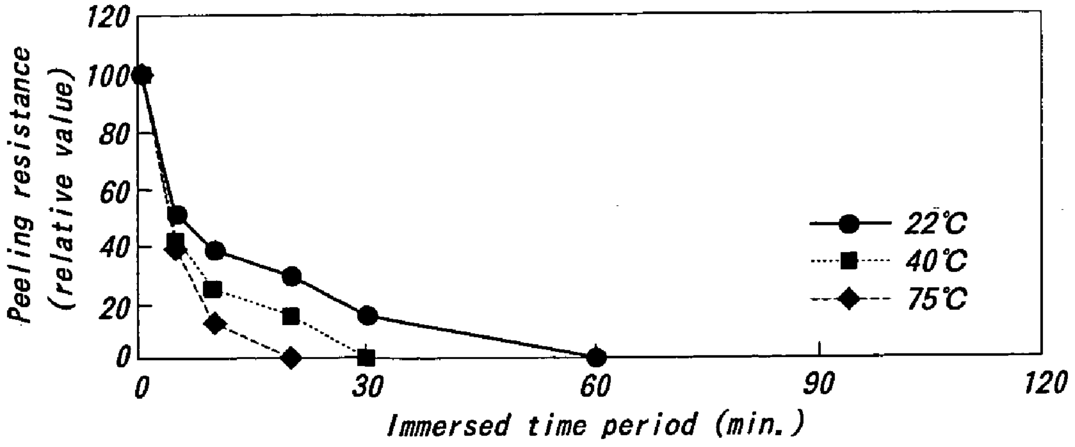

Next, the peeling characteristic of the tack label from the tack label-stuck plastic container of this invention, i.e., its solubility characteristic to water, is explained. Three kinds of tack labels where prepared by using hot water, soluble adhesive of this invention, a conventional synthetic resin adhesive, and a conventional water-soluble adhesive for the adhesive layer of the tack label, respectively. The peeling characteristic to the temperature was examined by immersing polyester container bodies on which such these tack labels were stuck into 22° C., 40° C., and 75° C. water, respectively. FIG. 5A shows the peeling characteristic of the tack label of this invention, FIG. 5B shows the peeling characteristic of the tack label using the conventional synthetic resin adhesive, and FIG. 5C shows the peeling characteristic of the tack label using the conventional water-soluble adhesive. In FIGS. 5A–C, the abscissa shows the immersing time during which the plastic container with the tack label was immersed into water at each temperature, and the ordinate shows the peeling resistance normalized by the peeling resistance before immersing the plastic container with the tack label into water. As shown in FIG. 5A, when the container with the tack label using the hot water-soluble adhesives of this invention is immersed into 22° C. water, the peeling resistance hardly changes even 120 minutes later. Furthermore, when the container is immersed in 40° C. warm water, the peeling resistance reduces a little. However, when the container is immersed in 75° C. hot water, the peeling resistance reduces abruptly with the lapse of time, and after about 20 minutes, the peeling resistance became about 0 and the label was peeled from the container surface.

On the other hand, in the case of the container with the tack label using the usual synthetic resin adhesive, the peeling resistance hardly changed with the lapse of time, and any difference with respect to the temperature of water was not observed.

In the case of the container with the tack label using the conventional water-soluble adhesive, the peeling resistance declined abruptly immediately after it was immersed into water at each of 22° C., 40° C. and 75° C. In the case of 75° C. hot water, the peeling resistance became about 0 after about 20 minutes. In the case of 40° C. warm water, the peeling intensity became 0 after 30 minutes, and in the case of 22° C. normal temperature water, the peeling resistance became 0 after 60 minutes.

As clear from the above-mentioned experiment results, the tack label having the conventional water-soluble adhesive easily peels, the tack label with water at the normal temperature, so that there is a possibility that the label may be peeled from the container in the washing process of the container. Accordingly, the conventional label cannot bear practical uses. Moreover, although the adhesive ability against water of the tack label having the conventional synthetic resin adhesive is excellent, it is unsuitable in recycling, since the label has high peeling resistance against hot water, too. On the other hand, even if the tack label according to this invention is immersed in water at 22° C.-normal temperature for 2 hours, the peeling resistance hardly reduces, whereas its peeling resistance becomes 0 only by immersing it in 75° C. hot water for 20 minutes. As a result, the label may be spontaneously peeled from the container. Therefore, the tack label of this invention has the very suitable property in both washing process and regenerating process.

Thus, as the adhesive layer 5 of the tack label of this invention is made of the hot water-soluble adhesive, the adhesion power reduces remarkably when the bottle with the tack label with which the tack label 1 is stuck is immersed in hot water, and the label is peeled from the container without performing special peeling work. In this case, since the adhesion area with the bottle 7 is very small as mentioned above, the tack label 1 can be peeled easily. Moreover, since the above-mentioned adhesive dissolves in hot water, the peeled tack label 1 hardly adheres onto the bottle 7 again. In addition, since the bottle 7 is a blow-molded product comprising polyester, it thermally shrinks in immersing it in hot water. The heat contraction force in this case causes a positional direction between the tack label 1 and the bottle surface, and promotes peeling of the tack label 1. For this reason, in the regenerating process of the polyester bottle, when the polyester biaxial blow-molded bottle with said tack label 1 is treated with hot water, hot water dissolves the adhesive and reduces the adhesion, and shrinks the bottle biaxially to cause the positional deviation between the tack label 1 and the bottle surface and to easily peel the tack. Moreover, since said adhesive dissolves in hot water, the tack label 1 does not adhere on the bottle surface again.

In addition, although the bottle 7 (or its milled pieces) sinks in water since the specific gravity of polyester is one or more (about 1.3–1.4), the label base material 2 has the property of floating in water since it is formed with the material whose specific gravity is less than one. Therefore, in the regenerating process of the polyester bottles, the used bottles are washed ground, and washed under stirring, the peeled tack labels 1 (ground pieces) and the bottle 7 (ground pieces) can be separated very easily by using ups and downs (specific gravity difference) in water.

Thus, as the tack labels 1 stuck on the bottles 7 can be peeled and removed efficiently in the regenerating process such as hot water treatment of the regeneration treating plant, and can be peeled easily with hands, the recycling of the polyester bottle is very easy.

In the above-mentioned embodiment, since the covering layer 4 is formed on the surface of the printed layer 3, the printed layer 3 is protected, and later can be given to the label surface by suitably choosing a resin or the like which comprises the covering layer 4.

The specific gravity of the material comprising said label base material 2 may be less than one, and is usually 0.3–0.99, preferably about 0.75–0.97. The label base material 2 may include any of synthetic papers, plastic films, laminates thereof, etc. having water resistance. It can be suitably chosen in consideration of printing aptitude, affinity with the adhesive, the separability from the bottle after label peeling, etc. The said synthetic paper may include internally foamed synthetic papers [brand name: YUPO (Oji-Yuka Synthetic Paper Co., Ltd.) etc.], surface-coated synthetic papers [brand name: PEACHCOAT (Nisshinbo Industries, Inc.) etc.], supun-bonded synthetic papers [brand name: TYVEK (Du Pont Co.) etc.], etc. Moreover, the said plastic film may include polyolefin films, such as polypropylene film and a polyethylene films, foamed plastic films, such as foamed polystyrene films, foamed polyester films, and foamed polyolefin films, etc. As for the plastic film, drawn films and non-drawn films may be used. Among them, internally foamed polyolefin resin-based synthetic papers and the drawn poly-propylene films, such as brand name "YUPO", particularly from the viewpoint of having the excellent printability, rigidity, cost, and labeling aptitude.

The thickness of the label base material 2 can be chosen in a range in which handleability, workability, etc. do not reduce, when used as the tack label 1, and usually is about 20 to 200 $\mu$m.

As for the surface of the label base material 2 on the side of the printed layer 3, a conventional surface treatment, such as corona electric discharge processing, plasma processing, flame processing, or acid processing, may be carried out for the improvement in the print quality.

The printed layer 3 is a layer which shows letters, pictures, etc., such as a brand name and handling notes and can be formed by a conventional printing method, such as screen printing, rotary letterpress printing, or gravure printing.

The material to constitute the covering layer 4 is not limited in particular as long as it can protect the printed layer 3. For example, the following resins etc. may be used: polyolefin resins, such as polyethylene and polypropylene; polystyrene resins, such as polystyrene, styrene copolymers containing styrene as a commoner; polyvinyl chloride; polyvinilidene chloride; and polyesters. The covering layer 4 can be formed by coating or film-laminating such a resins. The polyolefin resin is often used among above-mentioned resins. For example, the covering layer 4 can be formed by laminating a drawn polypropylene film on the surface of the printed layer 3. The specific gravity of the material to constitute the covering layer 4 is preferably less than one (for example, about 0.85–0.99, particularly about 0.87–0.97) for the same reason as in the case of the said label base material 2.

The thickness of the covering layer 4 can be suitably chosen in a range which does not damage handleability, etc. for the tack label 1. For example, it is about 10 to 50 $\mu$m.

For example, the covering layer 4 can be formed by a conventional laminating or coating method, such as an adhesion lamination, dry lamination, or extrusion lamination. In addition, in this invention, the covering layer 4 does not necessarily need to be formed.

The hot water-soluble adhesive to constitute the adhesive layer 5 will not be limited in particular if it dissolves in hot water (for example, hot water at about 60–100° C.). However, the hot water-soluble adhesive difficult to dissolve in water at normal temperature (for example, 15° C.) is preferable. The particularly preferable adhesive layer is formed with the adhesives which is not peeled in 30 minutes or more (preferably 2 hours or more, more preferably 6 hours or more) when an adhered object (for example, a polyester bottle) which sticks the tack label through the adhesive layer on it is immersed into 40° C. water and which can be peeled within 30 minutes, when the adhered object is immersed into hot water more than 75° C. (for example, about 75–95° C.). When using the tack label having such an adhesive layer, the label is not peeled easily after the label is stuck to the object, such as a polyester bottle and this object is immersed in water. Accordingly, the inside of the bottle can be washed with usual water such as tap water for filling the material, even after the label is stuck. Moreover, after attaining the predetermined purpose, the label can be easily peeled and removed with the hot water.

For example, a pressure sensitive adhesive such as an acrylic adhesive may be used as the hot water-soluble adhesive. Preferable hot water-soluble adhesives includes adhesives which have high solubility for hot water, and are hardly adhered again. For example, acrylic water-soluble adhesives which use, as base polymers, copolymers composed mainly of main monomer ingredients such as acrylic acid alkyl esters, for example, ethyl acrylate, butyl acrylate, 2-ethylhexyl acrylate (for example, $C_{2-10}$ alkylates), and methacrylic acid alkyl ester, such as butyl methacylate and 2-ethylhexyl methacrylate 2-hydroxyethyl methacrylate (for example, $C_{4-12}$ alkyl), commoner ingredients such as methyl acrylate, methyl methacrylate and vinyl acetate and ingredients such as carboxyl group-containing monomers, such as acrylic acid, methacrylic acid, and maleic acid, and hydroxyl group-containing monomers, such as 2-hydroxyethyl (meta) acrylate, together with nonionic surface-active agent to be added for improving hydrophilicity, such as polyoxyethylene nonylphenyl ethers and polyoxyethylene octylphenyl ether.

The thickness of the adhesive layer 5 is, for example, around 3–100 μm, preferably around 10–40 μm.

The adhesive layer 5 can be formed by applying the adhesive composition (emulsion, solution, or the like) containing the hot water soluble adhesive on the label base material 2 using a conventional coating means, such as a roll coater, a bar coater, a knife coater, and a sprayer.

The masking agent to constitute the non-adhesive masking layer 6 is any masking agent which can form the non-adhesive covering layer on the adhesive layer 5. For example, synthetic resins, such as varnish, paint, printing ink, acrylic resins (methyl polymethacrylate etc.), vinyl acetate, vinyl chloride, polystyrene, vinyl chloride-vinyl acetate copolymer, ethylene-vinyl acetate copolymer, silicone resin, and polyvinyl alcohol may be used as such a masking agent. It is particularly preferable to form the non-adhesive masking layer 6 by applying an ultraviolet cure printing ink by printing.

The thickness of the non-adhesive masking layer 6 can be suitably chosen in a range which damages neither handling nor sticking stability of the tack label 1 in sticking the tack label 1 on the bottle 7. Generally, it is about 2–30 μm, preferably about 3–15 μm.

The non-adhesive masking layer 6 may be formed in a central part of the surface of the adhesive layer 5 surface, leaving a peripheral edge portion in the shape of a ring, provided that a gap is ensured, at one edge portion of the surface of the adhesive layer 5, for peeling between the bottle surface at the time of the peeling work from a bottle. The plane form may be any of a rectangle, a triangle, a circular, an ellipse, etc.

Moreover, the entire surface area of the non-adhesive masking layer 6 is about 20 to 95% preferably 60–85% of the entire surface area of the adhesive layer 5 (or label base material 2). If the surface area of the non-adhesive masking layer 6 is 20% or less, the label-peeling property at the time of the peeling work from the bottle tends to reduce. Conversely, if the adhesion area is too small, there is a risk of the label peeling from the container during the distributing course.

The non-adhesive masking layer 6 can be formed by a conventional method (for example, a glue surface printing method described in the specification of Japanese patent No. 1,504,306).

In addition, in the tack label B of this invention, the non-adhesive masking layer does not necessarily need to be provided. But, it is preferable to prepare a non-adhesive masking layer in at least an one end of the surface of the adhesive layer so that it may be easy to pinch in the case of peeling with the hand. As mentioned above, it is particularly desirable to prepare the non-adhesive masking layer in a central part and at one end separated from the central part of the surface of the adhesive layer so that the adhesive layer may be exposed in the shaped of a ring.

A release sheet (separator) (not shown) is usually stuck on the surface on the side of the adhesive layer 5 of the tack label 1. In case that the tack label 1 is to be stuck in the bottle 7 release sheet is peeled for use.

In this invention, the form or the size of the label base material 2 are not limited in particular, but can be suitably chosen according to the form, the size, etc. of the polyester blow-molded bottle onto which the label is to be stuck.

In the polyester bottle with the tack label of this invention, a conventional polyester resin, for example, polyethylene terephthalate resin etc., is used as a material to constitute the blow-molded bottle 7 body. The bottle 7 can be produced by the conventional blow-molding method (for example, biaxial drawn blow-molding). Moreover, the tack label 1 can be stuck on the polyester bottle 7 by a conventional label sticking apparatus.

Although this invention will be explained based on an example in detail below, this invention is not limited to it at all.

An adhesive layer 5 was formed by applying, on one side surface of internal synthetic paper [brand name: YUPO (Oji-Yuka Synthetic paper Co., Ltd.), 170 m×140 mm, 80 μm thick] as a label base material 2 comprising an olefin resin whose specific gravity is 0.84, an emulsion type acrylic adhesive in a thickness of 25 μm, as a hot water-soluble adhesive comprising an acrylic acid alkyl ester-based copolymer whose main ingredients are butyl acrylate and 2-ethylhexyl acrylate. A label paper preform was produced by laminating a separator on this adhesive layer 5. A printed layer 3 was formed on a surface of the label base material 2 of this label paper preform and then a drawn polypropylene film (specific gravity: 0.92, thickness: 20 μm) was laminated, as a covering layer 4, through an adhesive layer not shown on the printed layer 3. After peeling the separator from the adhesive layer 5, a non-adhesive masking agent comprising an ultraviolet-curable printing ink was applied, in a thickness of 5 μm, on a central part 6*a* and one end portion 6*b* separated from the central part of the surface of the said adhesive layer (back side as label) so that the adhesive layer 5 might be exposed circularly in a width of 10 mm at the periphery of a label. A tack label 1 was obtained by laminating the separator again after curing the ink by irradiating ultraviolet rays to the ink applied surface. The exposed rate of the adhesive layer 5 was 22%.

When this tack label 1 was peeled from the separator and stuck on a round-shaped polyester biaxial drawn blow-molded bottle with a volume of 4 liters by a conventional labeler, sticking was able to be carried out beautifully and certainly without crease, float or the like. Tests were performed after keeping this bottle at the room temperature for eight days. The results are shown below.

(1) When the above-mentioned polyester bottle with the tack label was immersed in 92° C. hot water for 30 minutes, the tack label peeled completely. Moreover, the peeled tack label floated in water and has been easily separated from the bottle.

(2) When the edge part 6*b* of the tack label of the above-mentioned polyester bottle with the tack label was pinched to peeled the label with fingers, it was peeled easily, since the label had adhered only at the periphery. Moreover, the peeling resistance of the adhered portion (according to at 180 degrees provided in JIS Z0237) was measured to be 9.5 N/15 mm.

(3) When the above-mentioned polyester bottle with the tack label was immersed in 40° C. water and left for 30 minutes, the appearance didn't change and the tack label was not peeled, too.

What is claimed is:

1. A tack label comprising a label base material, a printing layer formed on a first surface of the label base material, an adhesive layer formed on a second surface which opposes the first surface of the label base material, wherein said adhesive layer comprises a hot water-soluble adhesive which is substantially insoluble in water at a normal temperature and readily soluble in hot water, and a non-adhesive masking layer formed in a central part of the adhesive layer, so that the adhesive layer has a ring-shaped adhesive area, and formed at only a part of an edge of said adhesive area.

2. The tack label according to claim 1, wherein said adhesive layer comprises an acrylic water-soluble adhesive.

3. The tack label according to claim 1, wherein a surface area of said masking layer is 5–90% of that of said adhesive layer.

4. The tack label according to claim 1, wherein said label base material comprises a material whose specific gravity is less than one.

5. A plastic container with a tack label stuck on a container body, wherein said tack label comprises a label base material, a printing layer formed on a first surface of the label base material, an adhesive layer formed on a second surface which opposes the first surface of the label base material for adhering the tack label on the surface of the container body, said adhesive layer comprises a hot water-soluble adhesive having a property which is substantially insoluble in water at a normal temperature and readily soluble in hot water, whereby said tack label is easy to peel from the container body under an environment with hot water while difficult to peel from a container body under a processing environment with the normal temperature water and a non-adhesive masking layer formed in a central part of the adhesive layer, so that the adhesive layer has a ring-shaped adhesive area, and formed at only a part of an edge of said adhesive area.

6. The plastic container according to claim 5, wherein the label base material of said tack label comprises a material whose specific gravity is less than one.

* * * * *